(12) United States Patent
Epp et al.

(10) Patent No.: US 9,467,425 B2
(45) Date of Patent: Oct. 11, 2016

(54) KEY REFRESH BETWEEN TRUSTED UNITS

(71) Applicant: Intel Corporation, Santa Clara, CA (US)

(72) Inventors: Edward C. Epp, Portland, OR (US); Zhaohui Yan, Portland, OR (US); Daniel P. Johnson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 13/846,176

(22) Filed: Mar. 18, 2013

(65) Prior Publication Data

US 2014/0281529 A1 Sep. 18, 2014

(51) Int. Cl.
*H04L 29/06* (2006.01)

(52) U.S. Cl.
CPC ......... *H04L 63/0428* (2013.01); *H04L 63/061* (2013.01)

(58) Field of Classification Search
CPC ..... H04L 63/08; H04L 63/0428; H04L 9/08; H04L 9/32; H04L 9/3271; H04L 63/061
See application file for complete search history.

(56) References Cited

U.S. PATENT DOCUMENTS

| | | | | |
|---|---|---|---|---|
| 5,371,794 A | * | 12/1994 | Diffie et al. | 713/156 |
| 2003/0061493 A1 | * | 3/2003 | Angelo et al. | 713/189 |
| 2003/0079143 A1 | * | 4/2003 | Mikel et al. | 713/200 |
| 2004/0176161 A1 | * | 9/2004 | Shelby et al. | 463/25 |
| 2008/0165958 A1 | * | 7/2008 | Matsushita | 380/44 |
| 2009/0106551 A1 | * | 4/2009 | Boren et al. | 713/158 |
| 2010/0014671 A1 | * | 1/2010 | Moroney | 380/262 |
| 2010/0211799 A1 | * | 8/2010 | Gladstone et al. | 713/189 |
| 2011/0055864 A1 | | 3/2011 | Shah et al. | |
| 2012/0047366 A1 | | 2/2012 | Yoo | |

FOREIGN PATENT DOCUMENTS

| | | |
|---|---|---|
| EP | 1221690 | 7/2002 |
| KR | 10-0750377 | 8/2007 |
| WO | WO 03/045036 | 5/2003 |
| WO | WO 2014/153332 | 9/2014 |

OTHER PUBLICATIONS

PCT International Search Report and Written Opinion in PCT International Application Serial No. PCT/US2014/031006 mailed on Jul. 25, 2014.

* cited by examiner

*Primary Examiner* — Chau Le
*Assistant Examiner* — Ghodrat Jamshidi
(74) *Attorney, Agent, or Firm* — Patent Capitol Group

(57) ABSTRACT

Encryption logic to identify a particular session key, where the particular session key is one of a plurality of session keys for use in encrypting content to be sent from a first device. The encryption logic is to encrypt particular content with the particular session key to obtain encrypted particular content. I/O logic is provided that can cause the particular content to be sent with a key refresh structure, where the key refresh structure is to identify that the particular session key was used to encrypt the particular content.

24 Claims, 9 Drawing Sheets

KEY REFRESH BETWEEN TRUSTED UNITS

FIELD

This disclosure pertains to computing systems, and in particular encryption between components of a computing system.

BACKGROUND

As electronic apparatuses become more complex and ubiquitous in the everyday lives of users, more and more diverse requirements are placed upon them. To satisfy many of these requirements, many electronic apparatuses comprise many different devices, such as a CPU, a communication device, a graphics accelerator, etc. In many circumstances, there may be a large amount of communication between these devices. Furthermore, many users have high expectations regarding apparatus performance. Apparatuses' abilities to be used in the presentation and consumption of multimedia content is also increasing. Some multimedia content is protected by copyright and other intellectual property laws and agreements. Apparatuses have been configured with hardware and software-based features to assist in the protection of such protected content.

DETAILED DESCRIPTION

Figure 1:
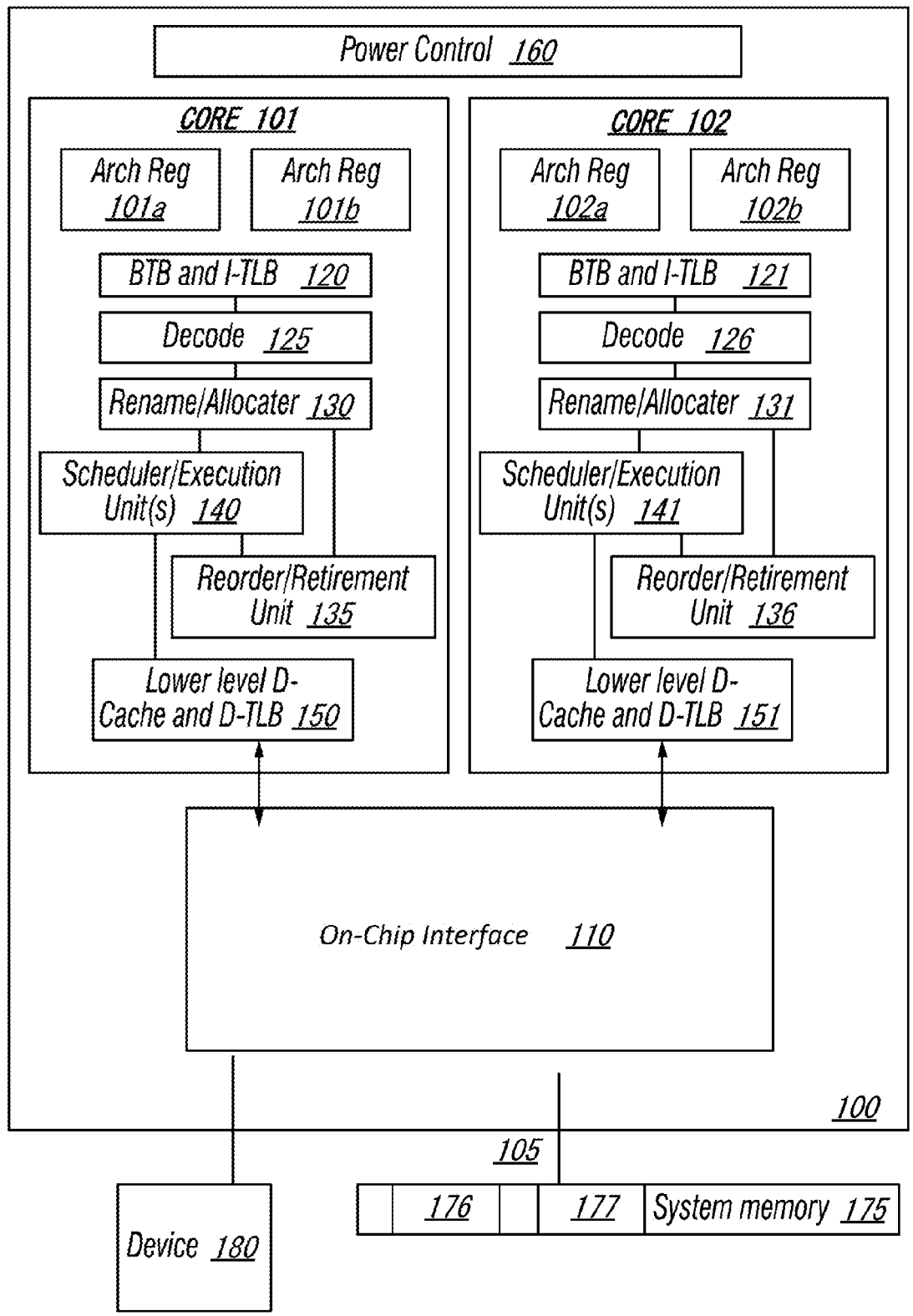
FIG. 1 illustrates a block diagram representing an example computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g., cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device, such as a transcoder in a media gateway computing system.

Recently however, as more logic and devices are being integrated on a single die, such as a SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or other device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in a system-on-chip (SOC) environment, even more devices, such as the network interface, co-processors, memory 175, graphics processor, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
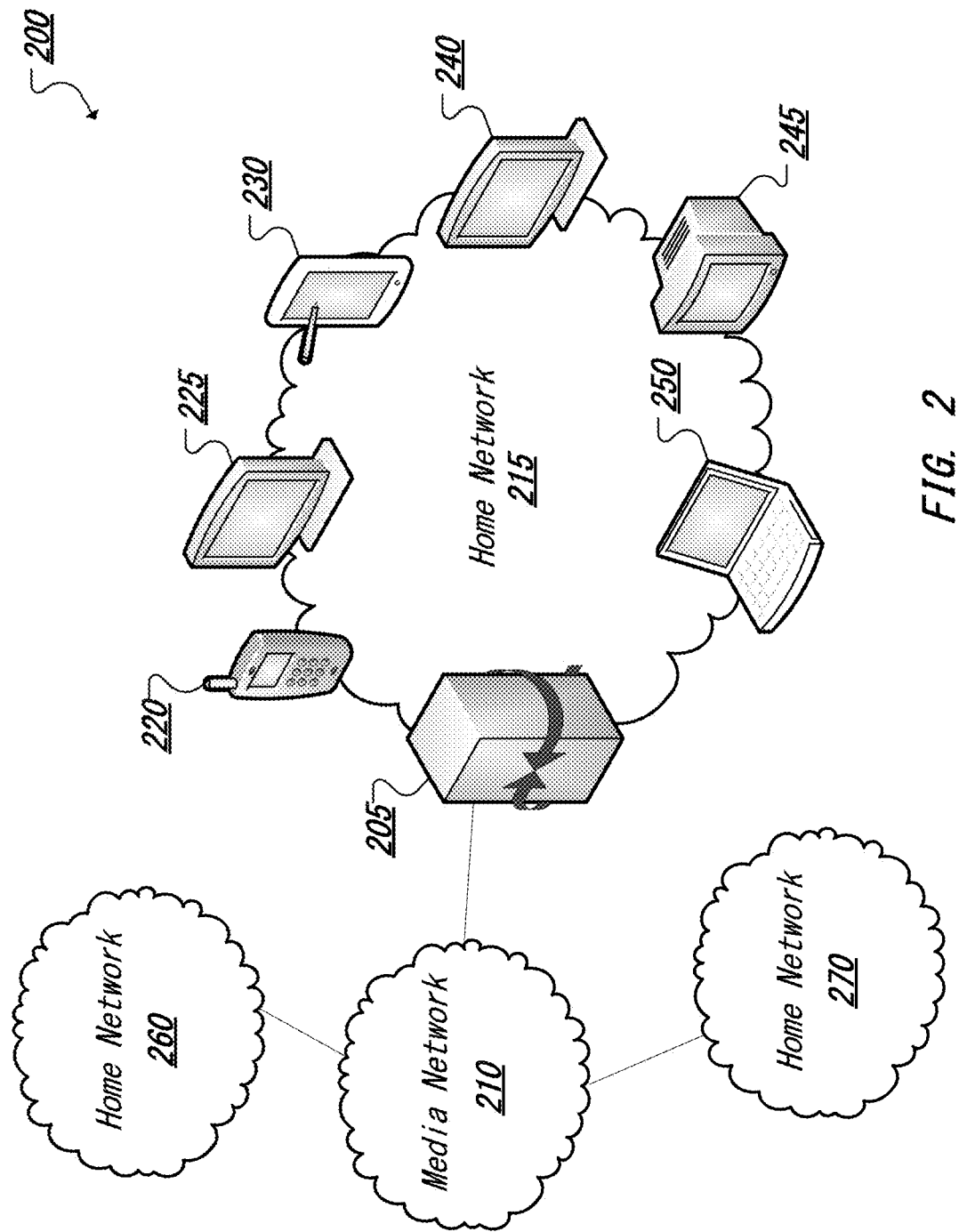
FIG. 2 is a simplified block diagram illustrating an example system to include a gateway device according to at least one example embodiment.

Turning to FIG. 2, a simplified block diagram is shown of an example media serving environment 200. A media gateway 205 can be included to provide media content hosted or otherwise provided by one or more media networks (e.g., 210). The media gateway 205 can receive digital media streams from one or more sources or source networks (e.g., 210) and translate or otherwise enable the media streams for consumption on various endpoint devices. For instance, a digital cable stream can be translated using the gateway to provide television, broadband internet, radio, security, and other services to one or more endpoint devices (e.g., 220, 225, 230, 240, 245, 250, etc.) included in a private network making use of the gateway 205, such as a home network 215. The media gateway 205 can further include functionality for providing other services or functionality in connection with the provision of digital content from a media network or other service provider. For instance, media gateway 205 can include storage capabilities, digital video recording functionality, and other services. Other gateway devices can also be provided on other networks (e.g., 260, 270) with endpoint devices capable of consuming media content provided through media network 210. Further, various service subscription levels can be supported, with example subscription levels providing varying types of content, data service, bandwidth, premium content, among other examples.

In some implementations, media gateway 205 can capture a cable or other media stream from media network 210 and transcode the signal into multiple different formats compatible with multiple corresponding types of the endpoint devices capable of presenting the media to users. Such endpoint devices 220, 225, 230, 235, 240, 245, 250 can include, as examples, televisions, set-top boxes, personal computers, laptop computers, voice-over-IP (VOIP) phones, telepresence and video conferencing systems, tablet computers, smartphones, personal digital assistants, feature phones, video game consoles, handheld video game systems, desktop computers, internet-enabled or other "smart" household appliances, stereo systems, portable audio players, and other devices and systems designed to interface with human users and capable of receiving and utilizing media (e.g., as transcoded by home gateway 205) provided through media network 210.

Attributes of endpoint devices, and computing devices generally, can vary widely from device to device, including the respective operating systems and collections of software programs loaded, installed, executed, operated, or otherwise accessible to each device. For instance, endpoint devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices. Further, endpoint devices can include or be operable with a variety of user interface devices, such as keyboards, touchscreens, remote controls, mouse, natural user interfaces (NUI), etc. Endpoint devices, depending on the types of media to be presented, consumed, or rendered by the endpoint device, can further include components such as speakers, display devices (including touchscreen or other interactive displays), cameras, projectors, and other features.

In general, "servers," "network devices," "systems," "clients," "endpoint devices," "gateways," and "computing devices," including the servers, client systems, and other computing devices in networks 210, 215, 260, 270 in example environment 200, can include electronic computing devices operable to receive, transmit, process, store, render, or otherwise use data and information associated with environment 200. As used in this document, the term "computer," "computing device," "processor," or "processing device" is intended to encompass any suitable processing device. For example, the system 100 may be implemented using computers other than servers, including server pools. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, gateways, endpoint devices, network devices, and computing devices can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services making use of data managed by data management system 105, among other examples. Further, in some implementations, servers can be configured to host, serve, or otherwise manage models and data structures, data sets, software service and applications interfacing, coordinating with, or dependent on or used by other services and devices. In some instances, a server, system, subsystem, or computing device can be implemented as some combination of devices that can be hosted on a common computing system, server, server pool, or cloud computing environment and share computing resources, including shared memory, processors, and interfaces.

Figure 3:
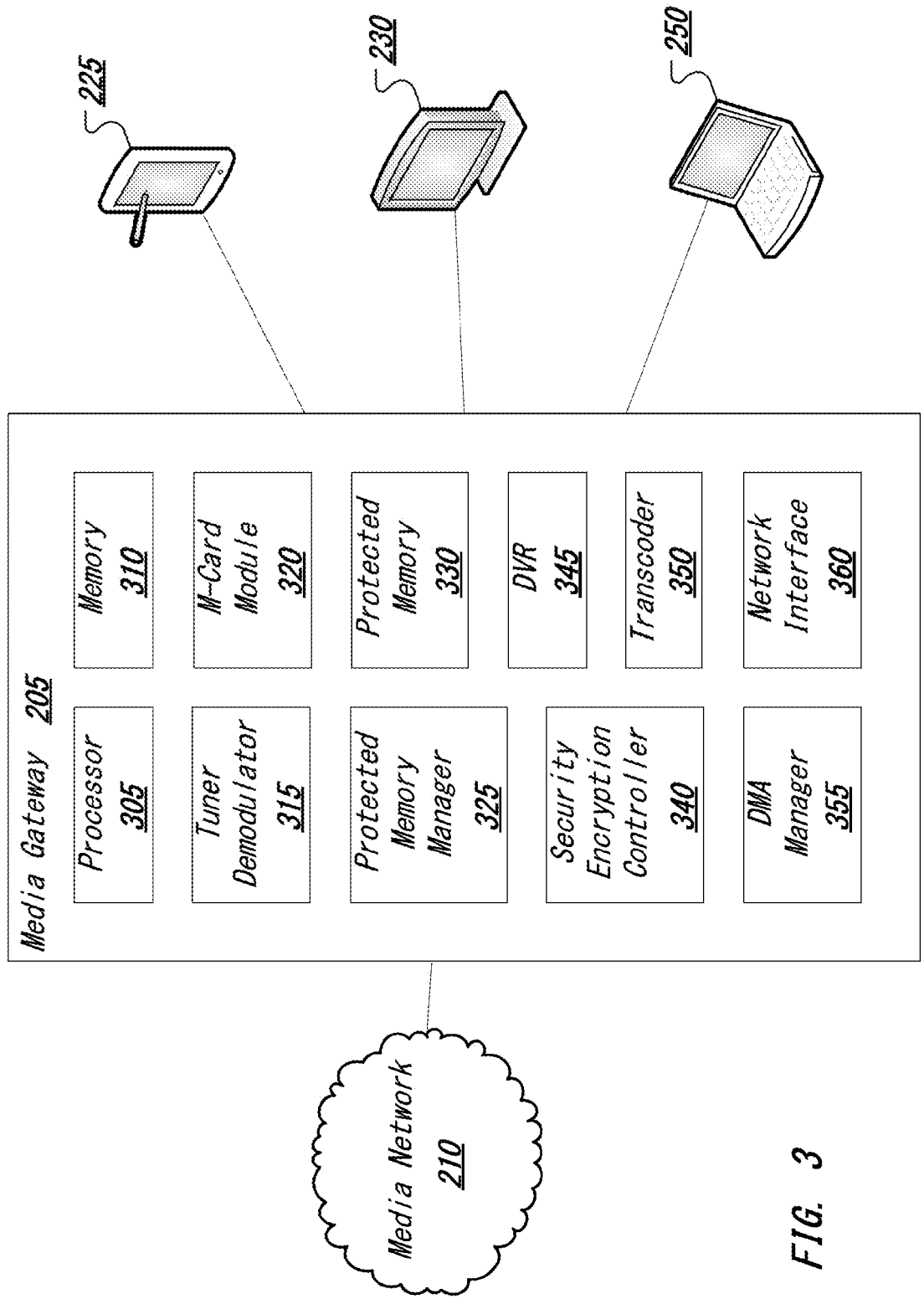
FIG. 3 is a simplified block diagram illustrating components associated with an example gateway device according to at least one example embodiment.

Turning to FIG. 3, a simplified block diagram is illustrated of an example media gateway 205, such as a media gateway for use in a home network including a variety of different endpoint devices (e.g., 225, 230, 250) capable of consuming media content streams from a media network 210. In one example implementations, media gateway 205 can include one or more processor devices (e.g., 305), memory elements (e.g., 310), and a variety of hardware, software, and firmware components for use in providing various functionality of the media gateway 205. In one example, a media gateway 205 can include such components as a tuner demodulator 315, M-card or CableCARD modules (e.g., 320), protected memory managers 325, protected memory 330, a security encryption controller (SEC) 340, a media recorder system (such as a digital video recorder (DVR) 345), a transcoder 350, digital rights management engine 355, one or more network interfaces (e.g., 360), among other potential components.

In some instances, various components of media gateway can be provided on single chipsets, subsystems, or other devices while other components are provided on other devices, chips, or subsystems of the media gateway 205. In some cases, various vendors, OEMs, or other providers can manufacture and provider various components of the media gateway 205. Components can communicate with other components over buses, interconnects, links, and other transmission media. Digital rights management can be an important concern, however, as media streams provided by a media network 210 can be subject to licenses and business models that are to restrict access to media content and services provided through media network 210 to authorized subscribers.

Communication of portions of the data stream from media network 210 between the various components of the media gateway 205 can potentially expose the licensed content to snoopers and other mechanisms capable of being employed (e.g., at the pins of interconnects, busses, etc.) to gain unauthorized access to protected or restricted content.

Accordingly, in some implementations, a media gateway can be provided with components and protocols for providing a trusted data path that assures that clear content is not communicated between components and only appears within protected memory regions of the media gateway 205. This can involve the definition of a variety of encryption keys and schemes to be used across the trusted data path to encrypt content as it passes between components, host accessible memory (or random access memories (RAM)), and other potentially vulnerable areas of the media gateway 205.

Figure 4:
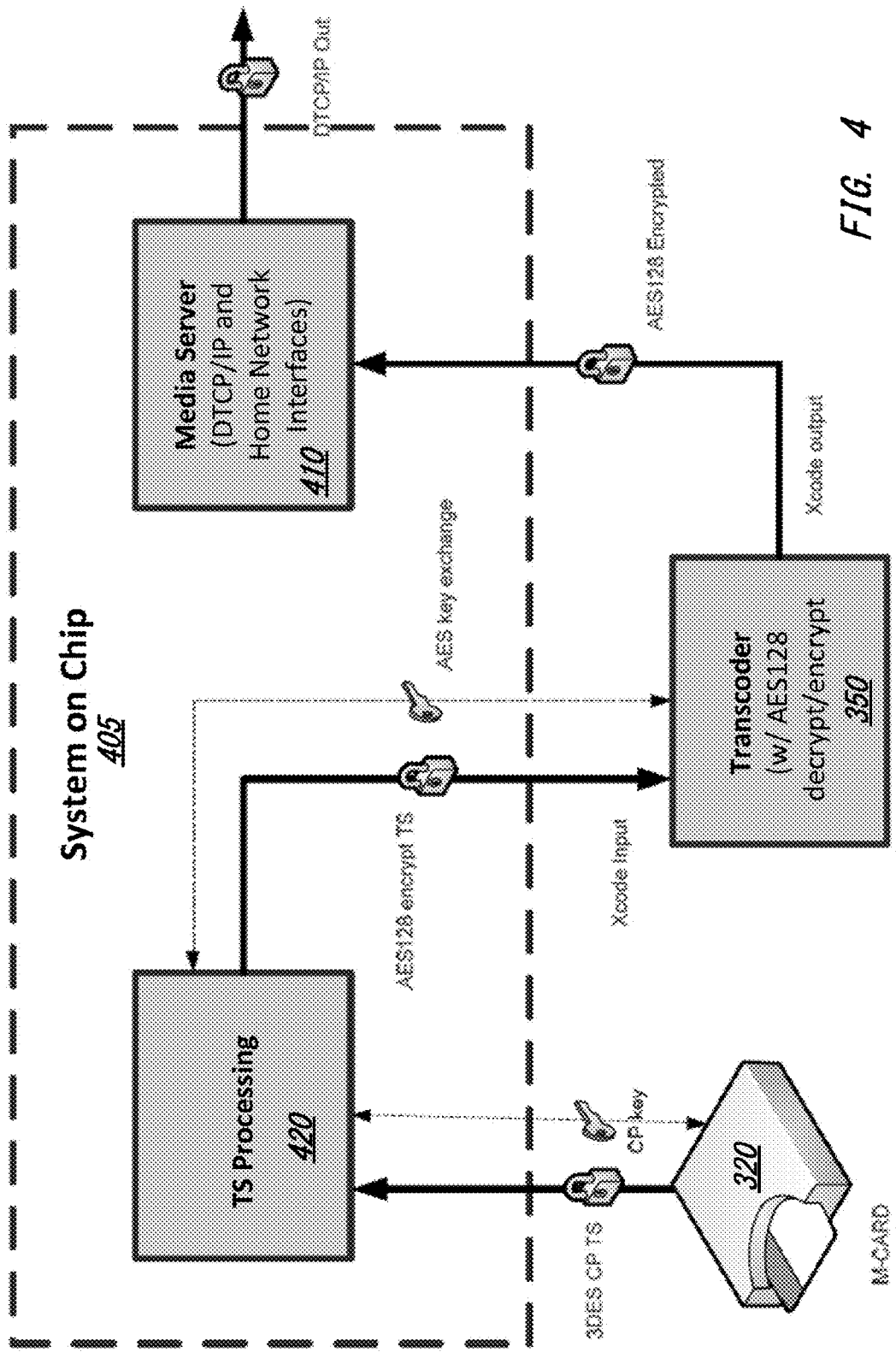
FIG. 4 is a simplified block diagram illustrating interactions associated with encryption of media content provided through an example gateway device according to at least one example embodiment.

Turning to FIG. 4, a simplified block diagram is shown of one example of a trusted data path defined within an example implementation of media gateway 205. In some implementations, some components of a media gateway can be embodied on a system on chip (SOC) architecture 405. Transmissions of protected data stream between the SOC components and other components implemented outside the SOC (e.g., on other chips or hardware within the media gateway) may be required to be encrypted. For instance, in one example, an M-card module 320 can be provided that can accept an M-card associated with a particular subscriber account. The M-card module 320 can include a device that hosts a physical, computer-readable card (e.g., an M-card) that stores subscriber information and codes (e.g., decryption keys) for unlocking scrambled digital cable signals from a media network. In one example, a content protection (CP) key (such as a Diffie Hellman (DH) key) can be negotiated between a transport stream (TS) processing block 420 and M-card module 320 allowing content descrambled using M-card module to be sent encrypted and protected to the TS processing block 420. The TS processing block 420 can include one or more components possessing functionality for further preparing the media stream for delivery to one or more endpoint devices. For instance, TS processing block 420 can include security processing capabilities for ensuring content encryption between the SOC and outside components as well as managing keys used in the encryption, among other examples. Indeed, it should be appreciated that while several examples described herein discuss link protection between a transcoder and SOC, these principles can potentially be employed in the protection of any link between two devices, such as in circumstances where an encryption key is to be refreshed at regular intervals.

Continuing with the example of FIG. 4, in some implementations, a transcoder 350 can be provided that is to translate a data stream into a plurality of different formats for use by a plurality of potential, different endpoint devices. As an example, a transcoder 350 can receive a variety of different content formats. For instance, the transcoder 350 can translate content including MPEG2 video with AC3 Audio to H. 264 Video with AAC-LC Audio, among other examples. The transcoder 350 can further change the frame rate, the picture size, resolution, and other attributes of the content, for example changing the format from 1080p 60fps to 720p 30fps or some other value as desired for the targeted rendering device (e.g., smartphone, tablet, television, etc.). Upon transcoding the data stream, transcoded data can be provided to a media server block 410 configured with one or more network interfaces to deliver the transcoded content and services to one or more different endpoint devices over one or more communication channels, including wired and wireless communication channels.

In some implementations, the transcoder can involve transmission of data from one component (e.g., TS processing block 420) to the transcoder 350 or from the transcoder 350 to another component (e.g., media server 410) over one or more links. Accordingly, streams to and from such transcoders 350 can be encrypted on the links to protect the data from unauthorized interception and use. For instance, an Advance Encryption Standard (AES) key exchange can be facilitated and the AES key(s) used to encrypt and decrypt data from the TS processing block 420 to the transcoder 350 and from the transcoder 350 to media server 410 (e.g., using another AES key).

Figure 5:
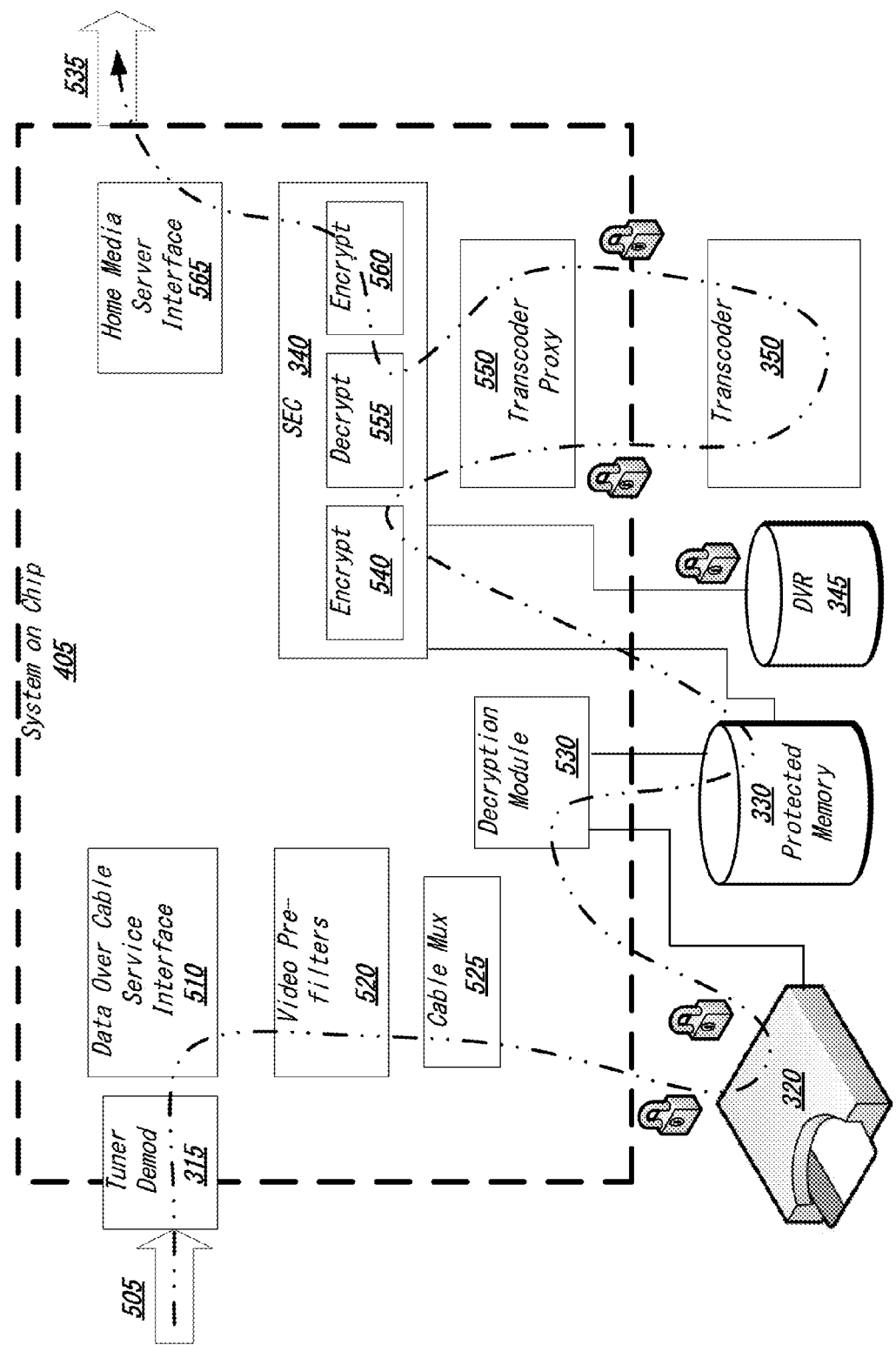
FIG. 5 is a simplified block diagram illustrating interactions between example components associated with an example gateway device according to at least one example embodiment.

Turning to FIG. 5, a simplified block diagram is shown of a more detailed flow of a data stream 505 from a media network, such as a steam 505 including quadrature amplitude modulation (QAM) signals, through a various components of a media gateway. In the particular example of FIG. 5, a system on chip (SOC) 405 may possess a tuner demodulator 315 that receives and demodulates the signals of data stream 505. The demodulated signals can be provided over a data over cable service interface 510 to one or more video pre-filters 520, cable multiplexers 525, and other pre-processing components before being provided to an M-card or CableCARD module 320. In this example, as the M-card module 320 is outside of the SOC, the transmission of the processed stream can be secured through encryption of the channel between the SOC and M-card module 320 and the stream data exiting the M-card module 320 can likewise be encrypted so that the data is not presented in the clear on the link or at the pins of the SOC 405 or M-card module 320 architecture.

Continuing with the example of FIG. 5, stream data can be deposited in protected memory 330 (inside or outside the SOC) and can further progress to a security encryption controller 340 to manage encryption and decryption of the signal as it is passed to and from a transcoder 350. In this example, the transcoder 350 can be provided separate from the SOC 405. The security encryption controller 340 can further manage encryption and decryption of the media for deposit in a DVR 345, including DVR devices provided as peripherals to the media gateway. A decryption module 530 can decrypt data (as encrypted in connection with transmissions to and from M-card module 320) for deposit in protected memory 330 and further to provide the decrypted stream to security encryption controller 340. The security encryption controller 340 can apply a different key and encryption scheme to encrypt the stream (e.g., using encryption module 540) for transmission to transcoder 350. The security encryption controller 340 can further communicate and synchronize the keys to be used in the encryption scheme with the transcoder 350. In one example, AES encryption keys can be utilized to encrypt and decrypt data transmitted between the SOC 405 and transcoder 350 (in some cases through a transcoder proxy 550 of the SOC), among other examples. The security encryption controller 340 can decrypt the transcoded stream (e.g., using decryption module 555) received from the transcoder 350 and re-encrypt the stream (e.g., using encryption module 560) utilizing still another encryption key or scheme that is used to encrypt the stream 535 that is to be provided through the media server interface(s) 565 for decryption and use at various endpoint devices serviced by the gateway. In other implementations, other example architectures, components, paths, and encryption schemes, etc. can be used among other examples.

In the case of encryption between an example security encryption controller 340 and transcoder 350, keys utilized in the encryption can be session keys. Further, session keys can be frequently renewed or refreshed during a session (e.g., at least once every 10 seconds) to mitigate against any one of the keys being intercepted and utilized to compromise the security of the channel between the SOC and transcoder. In one example implementations, the SOC and transcoder can be manufactured to share a common secret that allow the devices, within the same media gateway, to securely coordinate the session keys that are to be used in encryption of the path between the SOC and transcoder. The common secret, in one implementation, can be a unique message encryption key (MEK) embedded in hardware of each the SOC and transcoder. The MEK can be independent of any other keys utilized by the media gateway, such as the certificate authority keys used to decrypt the content as received by the media network. Further, the SOC, for instance, using security encryption controller 340, can generate session keys to encrypt the media data streams communicated between the SOC and transcoder. The session keys, in some implementations, can be random cipher scrambling keys (CSKs). Further, the session keys can be encrypted using the MEK and transmitted to the transcoder over a reliable sideband channel, such as a TCP sideband channel. The MEK can be provisioned in a secure manufacture environment and use of the MEK can be restricted only to encrypting the session keys for use between the SOC and transcoder. In some cases, the MEK can be authenticated prior to use in a session, to confirm that the MEK is the one provisioned at manufacture and is secure.

A primary channel can be provided between the SOC and transcoder for the transmission of content. This channel can be tolerant of occasional packet loss and out-of-order (OOO) reception. In some implementations, the transmission protocol utilized for the primary channel can have low overhead and permit four or more stream to be concurrently supported. Each of the streams can have a corresponding session key (or session key pair). In one example, the in-band channel can be a UDP channel.

Session keys can be provided in pairs in some implementations. One key in the pair can be designated to encrypt content to send on the path between the SOC and transcoder, and the other key can be used to decrypt the encrypted content, among other potential examples. Indeed, session key pair can be thought of as providing two roles: the first key is to encrypt content from a protected memory region to host accessible memory, while the other key is to decrypt content from the host accessible memory to the protected memory. The session key pair can be generated by the security encryption controller and sent in a single encrypted (e.g., with the MEK) from the SOC to the transcoder over a sideband channel.

In some implementations, the security encryption controller and transcoder can be configured to support the encryption of out-of-order packets together with the refreshing of session keys within a particular session. In some implementations, the security encryption controller (and SOC) and transcoder can synchronize the refreshing of the session keys used by the security encryption controller and transcoder with transmission of content between the transcoder and SOC. For instance, the encrypting and sending of content can be synchronized, or otherwise timed (e.g., delayed) to coincide with the sending of the encrypted configuration structure communicating the next session keys to be used after a refresh. In other instances, a key refresh structure can be provided that can be embedded in the encrypted stream to indicate which of the potentially multiple sessions keys used in a transcoding session was used in the encryption of the stream. Further, the key refresh structure can be used to identify which corresponding session key to use to decrypt the incoming encrypted content data.

In some implementations of a media gateway, large buffer sizes can be supported to encourage better performance and delivery of high-bandwidth media content. Each buffer can be encrypted with a single key to simplify flow and improve overall performance. Additionally, small buffer header footprint and overhead can be implemented to further enhance these and other example advantages.

In some implementations, a protocol can be defined, such as that introduced above, to convey session-based encryption/decryption keys from a SOC host processor to the transcoder processor, under the context of overall transcoding session command and control. In some implementations, basic socket level communications can be facilitated by a transcoder vendor abstraction layer. Session keys can be generated in a security encryption controller processor for both inbound and outbound content data to be conveyed to and from the transcoder for processing. Such session keys can be communicated to the transcoder through a secure configuration data structure that is encrypted by a mutual key (e.g., MEK) and communicated over a TCP-based out-of-band socket. Further, a key refresh structure can be generated to assist in the management of the potentially multiple session keys active in a transcoding session (e.g., to account for out-of-order packets and asynchronous management of session key refreshes, etc.). The key refresh structure can include data presented as clear text and prepended to the beginning of each encrypted data buffer. The key refresh structure can identify the session key pair that is to apply to the encrypted data buffer, indicating one or more key identifiers known to both the security encryption controller and identifying one of the previously communicated session keys. Accordingly, the communication of the secure configuration structure and the in-band data flow may be allowed to not be synchronized as the key identifier or sequence number in the key refresh structure effectively provides the synchronization for ensuring the right keys are used.

In some implementations, the secure configuration structure can be sent as part of the session setup for the transcoding session. In some implementations, for each transcoding session, at least both the immediately preceding (and, in some cases, more previous versions) and current versions of the encryption/decryption keys can be kept by both the security encryption controller and the transcoder to accommodate out of order delivery of data buffers over the in-band (e.g., UDP) sockets. For the transcoder in such cases, key refresh signaling (e.g., via the key refresh structure) can apply to both the inbound data flow as well as the outbound data flow at the same time. The security encryption controller can be responsible not only for session key generation but also for initiating and managing the key refresh structure insertion into the content data flow. This can be done prior to the final data buffers being written to the sockets, among other examples.

Figure 6:
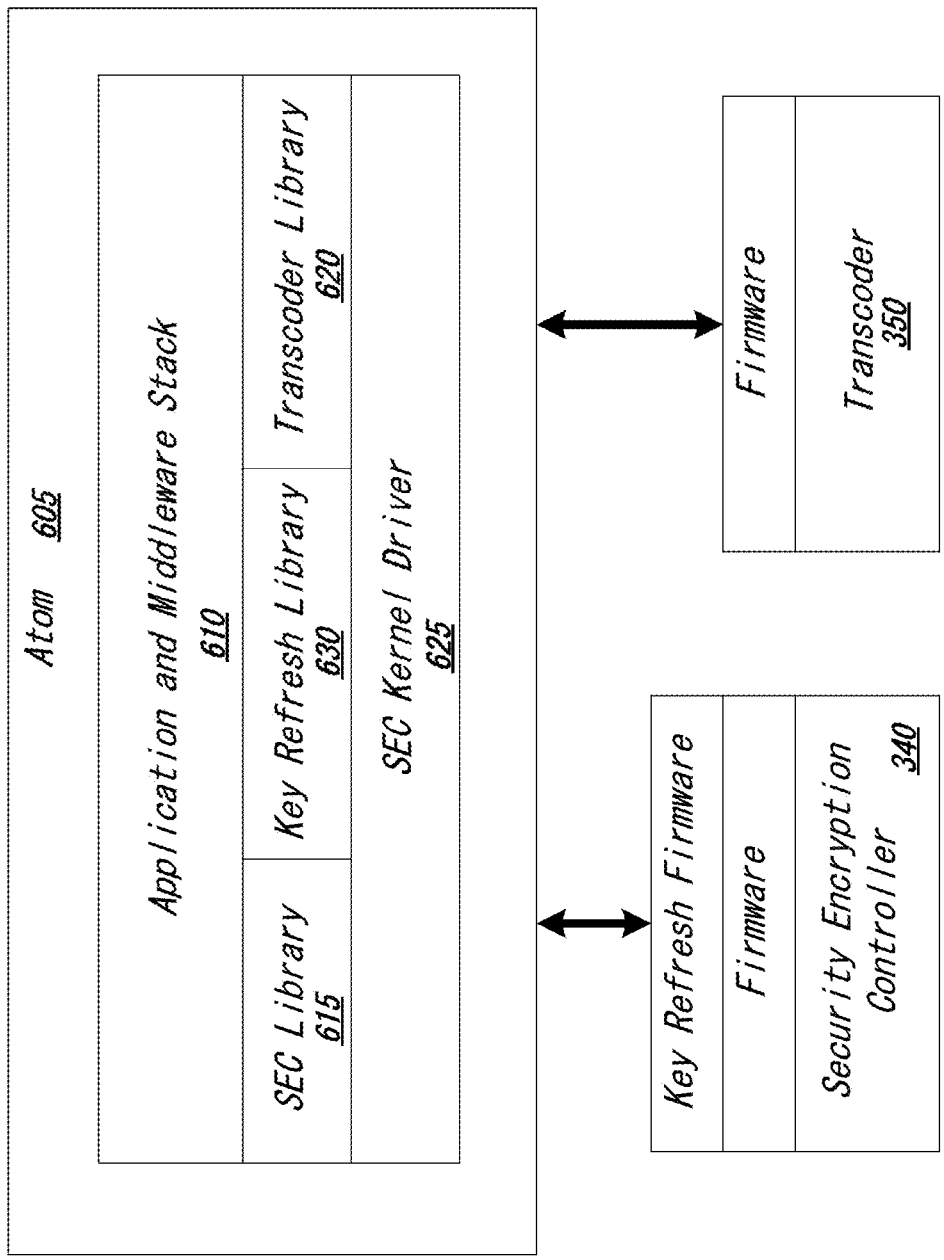
FIG. 6 is a simplified block diagram illustrating an example atom of an example gateway device according to at least one example embodiment.

Turning now to FIG. 6, a simplified block diagram is shown illustrating a particular implementation of a processor atom 605 for use in communicating and synchronizing encrypted content exchanged between an example security encryption controller 340 and transcoder 350. The atom 605 can include an application and middleware stack 610, security encryption controller (SEC) library 615, key refresh library 630, transcoder library 620, and SEC kernel driver 625 (among potentially other components not explicitly illustrated or described in connection with FIG. 6).

Protection of a link between the security encryption controller 340 (e.g., of a SOC) and the transcoder 350 can be implemented, at least in part, by interfaces specified by the SEC library 615, key refresh library 630, and transcoder library 620. Software of application and middleware stack 610 can use the libraries 615, 620, 630 in connection with this link protection. Generally, the atom 605 can utilize the libraries to facilitate the communication of both encrypted content streams and secure configuration structures (and included session keys) between the security encryption controller 340 and transcoder 350 as well as manage the use of key refresh structures and values used in connection with transcoding sessions involving the communication between security encryption controller 340 and transcoder 350.

In one implementation, a key refresh library 630 can provide one or more functions to cause CSK session keys to be generated (e.g., by the security encryption controller 340 in response to a call by software implemented in application and middleware stack 610). A session key pair can be generated that includes two keys, one to encrypt/decrypt content sent from the SOC to the transcoder, the second to encrypt/decrypt content sent from the transcoder to the SOC. A policy can be defined to determine if and how many previous session key pairs are to be maintained at each of the security encryption controller 340 and transcoder 350 to support out-of-order content packets, etc. In one example, the SEC library 615 can provide the functions to initiate encryption and decryption of content with the session keys at the security encryption controller 340. The transcoder library 620 can provide the functions to pass encrypted session keys to the transcoder. In addition, it can provide functions to exchange encrypted content between the SOC and transcoder, among other examples and implementations.

The transcoding session (and encryption of the session) can be controlled at least in part by software and the libraries can provide APIs between the software and the security encryption controller 340 and transcoder 350. For instance, a key refresh API call can be made to security encryption controller to cause a new session key to be generated. The session keys (i.e., one for encrypting/decrypting data from the security encryption controller 340 to the transcoder 305, the other for encrypting/decrypting data from the transcoder 340 to the security encryption controller 340) can be generated by the security encryption controller 340 and encrypted by an MEK at the security encryption controller 340. The security encryption controller 340 can return the new encrypted session keys to the atom 605 and the atom can assign, using key refresh library 630 and application middleware stack 610, a single identifier for the pair of keys, or alternatively, a respective identifier for each of the individual keys. In some cases, the key identifiers can be an incremented value, with each key refresh causing the key identifier to increment by one. In other instances, the algorithm for generating the key identifiers can follow a more complex scheme, the algorithm being known to the security encryption controller 340 and transcoder 350. In the case of an algorithm that generates less predictable identifiers (at least to outside components) the generation and assignment of subsequent key identifiers can be deterministic in that each of the security encryption controller 340 and transcoder 350 are able to derive or expect a particular key identifier for each new session key that is generated within a session, or alternatively, over the lifetime of the security encryption controller 340 and transcoder 350, among other potential examples and implementations.

Each of the security encryption controller 340 and transcoder 350 can maintain or access a mapping of session key identifiers to the corresponding session key. When content is encrypted using one of the session keys, the buffered content data can be prepended with a key refresh structure that identifies the session key used to encrypt the content. Prior to encrypting, the security encryption controller 340 or transcoder 350 can identify the session key that is currently active and encrypt outbound data using the active session key, prepending the encrypted data with a corresponding key refresh structure. In cases where a session key refresh has occurred prior to the receipt of data encrypted using the previous session key, the recipient (e.g., either security encryption controller 340 or transcoder 350) can nonetheless identify that the received data was encrypted using the previous session key (e.g., from the key refresh structure included in the received data) and access the previous session key to decrypt the received data.

Figure 7:
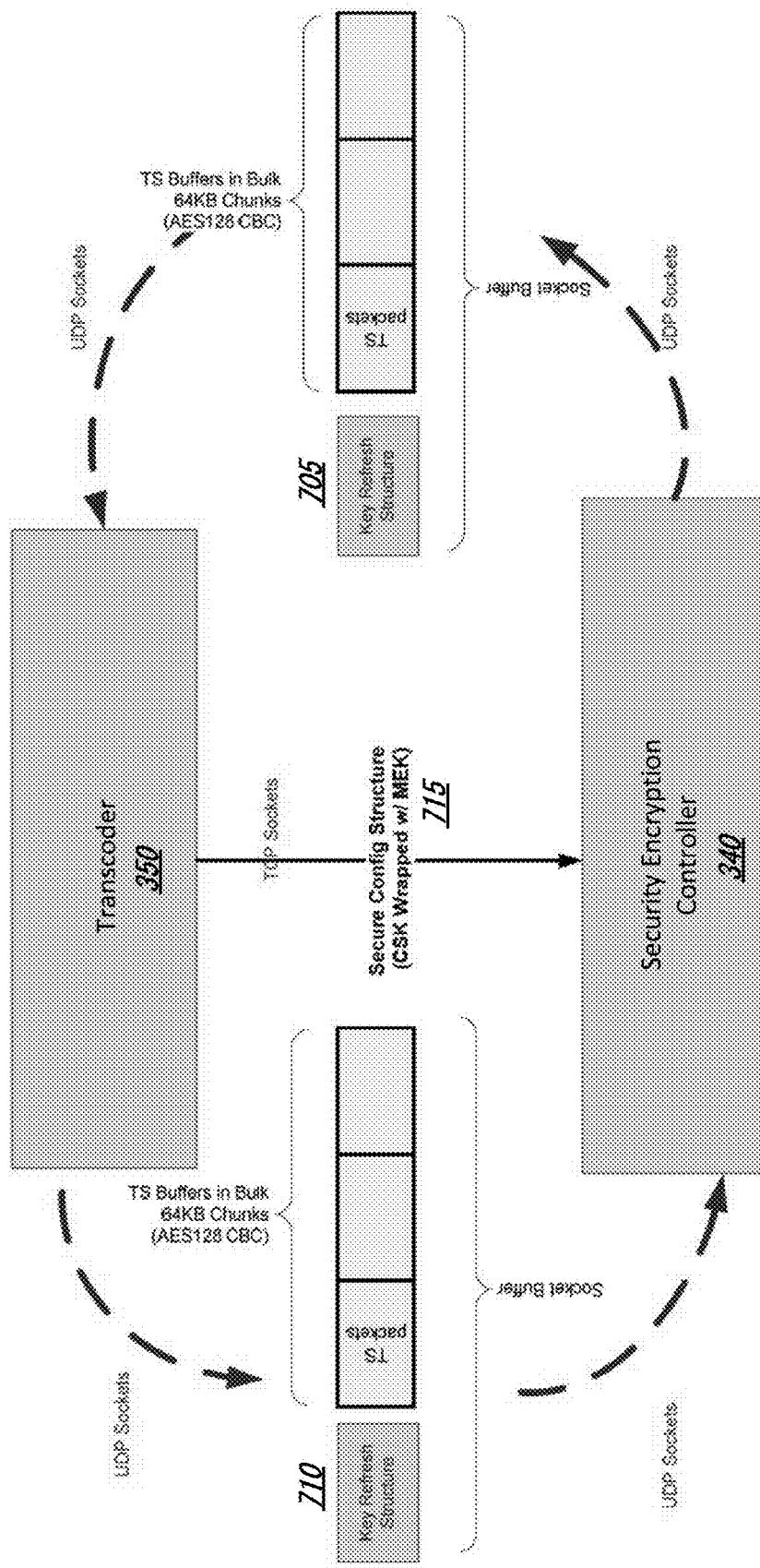
FIG. 7 is a flow diagram illustrating activities associated with encryption of media content provided through an example gateway device according to at least one example embodiment.

Turning to FIG. 7, in some implementations, the security encryption controller 340 or transcoder 350 can buffer content stream data to be sent and when the protected memory buffer is full (or upon another trigger), the security encryption controller 340 or transcoder 350 can call a session ID function to assign (or receive an assignment of) a session key identifier for the buffer. The device (e.g., 340, 350) can encrypt the clear text data with the corresponding session key and encode the outgoing buffer header (e.g., or another field implementing the refresh key structure) with the session key identifier. The encrypted buffer and the key refresh structure can then be sent to the other device. The receiving device can identify the session key from the key refresh structure and identify the corresponding (previously previsioned) session key for use in decrypting the buffer.

As shown in FIG. 7, transcoder stream (TS) packets can be sent over UDP sockets with an included key refresh structure (e.g., 705, 710) between the transcoder 350 and security encryption controller 340. The session keys (e.g., a CSK) can be initialized and refresh during the course of a transcoding session. The security encryption controller 340 can generate new session keys periodically to replace previous session keys used in the session and send the new session keys in a secure configuration structure (e.g., at 715), or other message or structure including the session keys encrypted by a common secret or key, such as an MEK.

In one implementation, session key refreshes can occur on buffer boundaries. Clear content stream packets can be collected in a buffer of the security encryption controller 340 or transcoder 350 (e.g., the sending device) in a protected memory of the sending device. Large buffers (e.g., buffers 64 KB or greater) can be employed and each such buffer can be encrypted, where possible with a different session key. A first session key can be used to bulk-encrypt the buffer and a clear key refresh header (e.g., 705) can be prepended to the encrypted buffer to identify the first session key. Prior to filling or otherwise triggering the sending of the next such buffer, a call can be made (e.g., to a software-based controller or library of an atom of the media gateway) to initiate the generation of the next session key by security encryption controller 340. The next session key identifier can be assigned to the next session key and the next session key can be used to encrypt the next buffer to be sent to the receiving device (e.g., the security encryption controller 340 or transcoder 350, as the case may be). The next buffer, when encrypted, can be sent with a corresponding key refresh structure identifying the next session key, and so on until the transcoding session is completed. In some instances, the initiating of new session keys and session key identifiers can be driven by the security encryption controller 340. In other instances, software-based controllers in the atom can provide this functionality, for instance, identifying that a new session ID is to be generated each time it forwards an encrypted buffer between the security encryption controller 340 and transcoder 350, among other examples.

In some implementations, the session key generated by the security encryption controller 340 can be a 16-byte AES key. In some implementations, the session key identifier can be implemented as a 4-byte unsigned integer key sequence number used to synchronize keys with the encrypted content. For instance, in one example, the session key identifier can include the key sequence number that starts with a value of 0 at system boot time. The key sequence value can be incremented by 1 before each call to the key refresh function. In other words, the first key sequence number passed to the transcoder after boot is 1, the sequence number wrapping from 0xFFFFFFFF to 0x00000000.

Further, a flag within a security encryption controller internal key store (or in the case of the transcoder, the internal key store of the transcoder) can specify whether the key is an outbound or inbound key. Further, in one example implementations, four keys can be maintained for each content channel, two for encryption and two for decryption (e.g., the current keys and the immediately preceding keys, or, alternatively, the current keys and the immediately succeeding keys (e.g., in the cases of refreshes coinciding with buffer boundary)), among other examples.

In one example, a software-based atom controller can generate session key identifiers. The session key identifier can be included in security encryption controller API calls the atom makes to have buffers encrypted or decrypted buffers, and can prepend outgoing buffers with a session key identifier, for instance, through a key refresh structure. An atom-based controller can further control the handling of buffers being sent and received, including deciding which session keys to use and prepending the key refresh structure on outgoing buffers and removing the key refresh structure, in some cases, from incoming buffers. The transcoder 350 generates the key refresh structure (e.g., 710) on the return buffer using the current active "session key ID" that it received from the atom controller. The atom controller can identify which session keys were used to encrypt each buffer as it was responsible for instigating the encryption by calling SEC APIs and designating which key to be used each time it does so. Indeed, the session key to use for decrypting buffers received from the transcoder 350 is identified by the key refresh structure (e.g., 710) returned from the transcoder, and the atom controller can use that to identify the corresponding session key to be used by the security encryption controller (via corresponding security encryption controller API) in a buffer decryption requested by the atom controller to be performed by the security encryption controller, among other potential examples and architectures.

Figure 8:
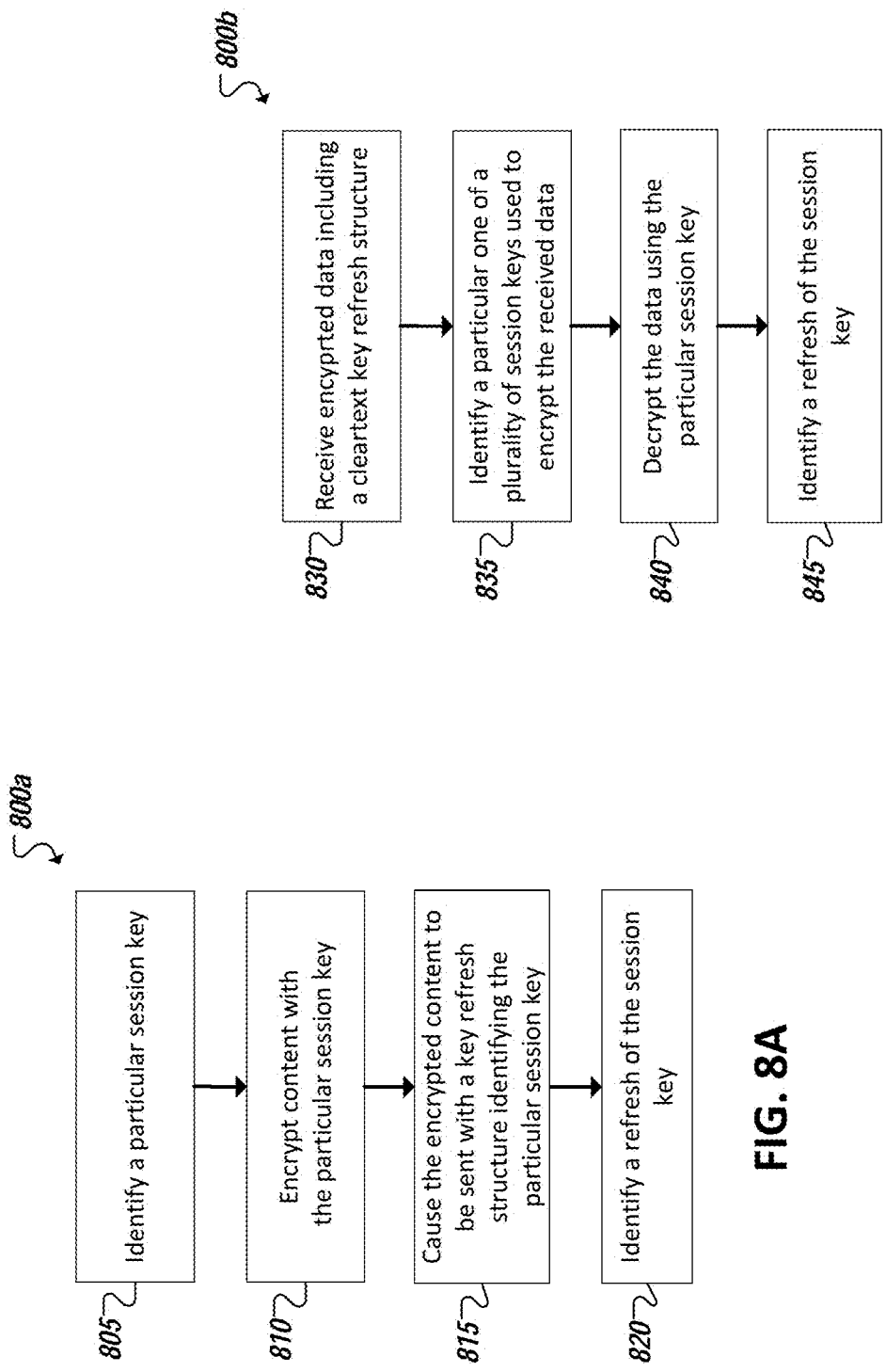
FIGS. 8A-8B are flow diagrams illustrating activities associated with encryption of media content provided through an example gateway device according to at least one example embodiment.

Turning to FIGS. 8A-8B, flow diagrams 800*a-b* are shown illustrating example techniques in connection with the protection of a media gateway link connecting a system on chip (SOC) and transcoder. For instance, logic can be provided on a device, for instance, a security encryption controller, to identify 805 a particular session key that is to be used in the encryption of data, such as bundles of media content packets, that are to be sent from one device (e.g., an SOC) to another device (e.g., a transcoder). The particular session key may be one of a plurality of session keys that are maintained by a first device in a session with the second device. At least some of the plurality of session keys may be "old" keys that may potentially still apply to one or more out-of-order packets encrypted with the old key after a key refresh has taken place. Accordingly, copies of the old session keys may be maintained for some period to handle such out-of-order packets, among other scenarios. Certain content, such as a plurality of packets, can be encrypted 810 using the particular session key and can be caused 815 to be sent to the second device (e.g., over one or more interfaces or using one or more libraries). The encrypted content can include with it a cleartext key refresh structure that identifies the particular session key to the second device to assist the second device in identifying which of the session keys to use to decrypt the content. Session keys can frequently refresh, for instance, after each transmission of encrypted transmission. A session key refresh can be identified 820 and handled, such that the first and second devices are able to derive or otherwise identify a commonly-known identifier of new session keys generated in the refresh. Identification of the session key refresh can include the receipt of a new session key, a call to generate a new session key (e.g., from an atom controller), among other examples. Content encrypted with the new session keys can include a key refresh structure that identifies the corresponding identifiers assigned to the new session keys and known to the devices in the session.

Turning to FIG. 8B, encrypted data can be received 830 from another device and the encrypted data can include a cleartext key refresh structure. In some implementations, the key refresh structure can include data prepended to the encrypted data. The key refresh structure can identify the key (or key pair) used to encrypt the data (or that is to be used to decrypt the data) and the receiving device can identify 835 the key to use to decrypt the data from the key refresh structure. The key may be one of a plurality of active keys that could potentially apply to data transmitted between first and second devices, including "old" keys used to encrypt out-of-order packets following a key refresh. The data can be decrypted 840 using the identified key. Subsequent key refreshes can also be identified 845 and managed, for instance, in response to the receipt of a new session key or key pair that is to be used in the session and that is received over a sideband channel, among other examples.

Figure 9:
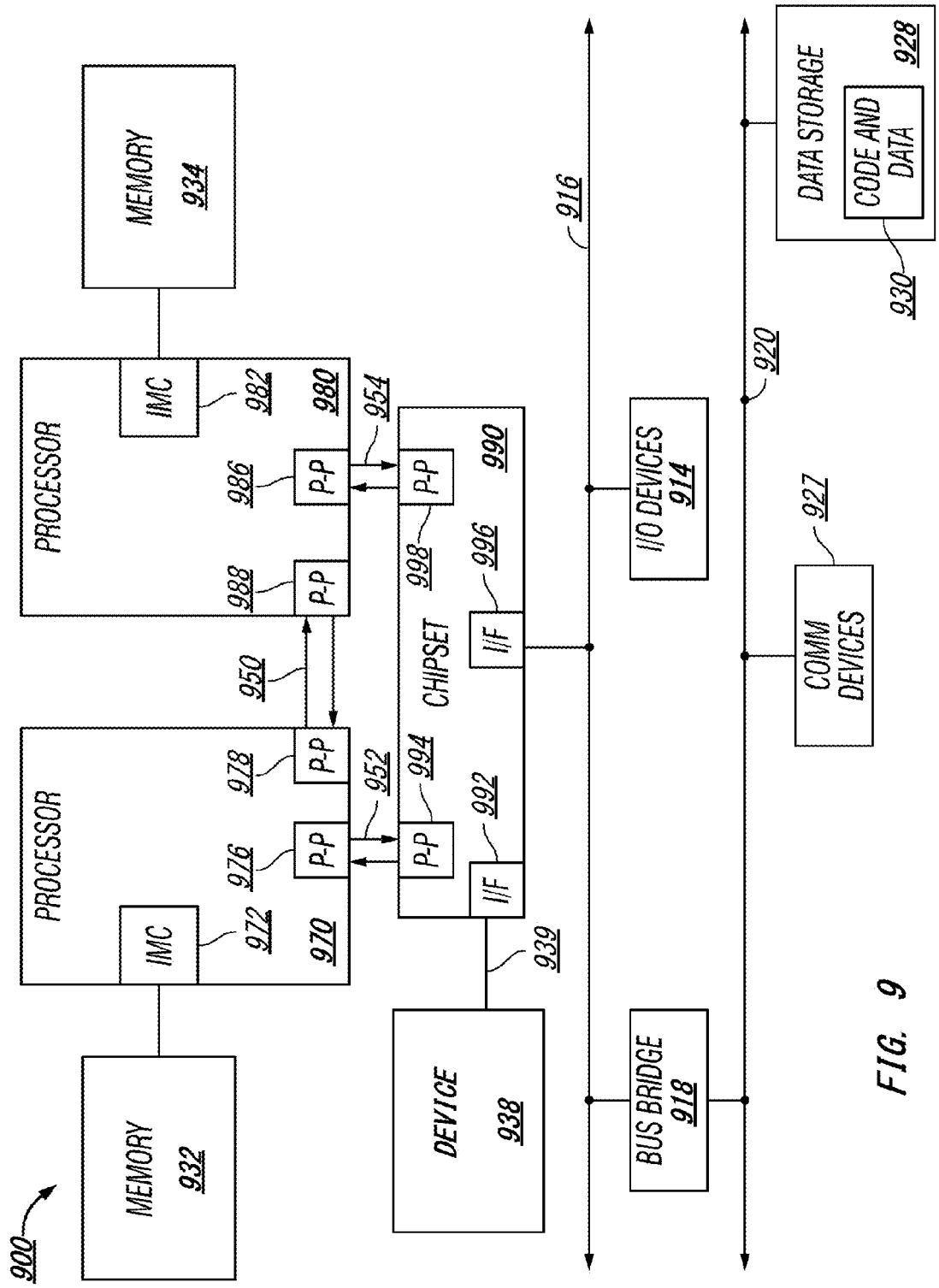
FIG. 9 illustrates another simplified block diagram for a computing system including a processor.

Turning to FIG. 9, a block diagram is shown of an exemplary computing system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of a processor. In one embodiment, 952 and 954 are part of a serial, point-to-point coherent interconnect fabric, such as Intel's Quick Path Interconnect (QPI) architecture. As a result, the invention may be implemented within the QPI architecture.

While shown with only two processors 970, 980, it is to be understood that the scope of the present invention is not so limited. In other embodiments, one or more additional processors may be present in a given processor.

Processors 970 and 980 are shown including integrated memory controller units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 each exchange information with a chipset 990 via individual P-P interfaces 952, 954 using point to point interface circuits 976, 994, 986, 998. Chipset 990 also exchanges information with other devices (e.g., 938), such as devices remote from a chipset, via an interface circuit 992 along a high-performance or other interconnect 939.

A shared cache (not shown) may be included in either processor or outside of both processors; yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 are coupled to first bus 916, along with a bus bridge 918 which couples first bus 916 to a second bus 920. In one embodiment, second bus 920 includes a low pin count (LPC) bus. Various devices are coupled to second bus 920 including, for example, communication devices 927 and a storage unit 928 such as a disk drive or other mass storage device which often includes instructions/code and data 930, in one embodiment. Note that other architectures are possible, where the included components and interconnect architectures vary. For example, instead of the point-to-point architecture of FIG. 9, a system may implement a multi-drop bus or other such architecture. Additionally, it should be noted that the computer system of FIG. 9 has been provided by way of example only and it should be appreciated that any variety of other computer systems and computer system architectures and platforms may be instead be utilized in a media gateway or to embody any of the principles described above.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, and a method to provide encryption logic to identify a particular session key, where the particular session key is one of a plurality of session keys for use in encrypting content to be sent from a first device, and encrypt particular content with the particular session key to obtain encrypted particular content. I/O logic can also be provided to cause the particular content to be sent with a key refresh structure, where the key refresh structure is to identify that the particular session key was used to encrypt the particular content.

One or more examples can further provide encryption logic further to identify a refresh of the particular session key, where the refresh includes identification of a new session key for a session between the first and second devices, and use the new session key to encrypt subsequent content to be sent to the second device.

In at least one example, the new session key is associated with a new identifier accessible to both the first and second devices.

One or more examples can further provide the encryption logic to generate the particular session key, where the particular session key is to be associated with a particular key identifier identifiable to each of the first and second devices and included in the key refresh structure.

One or more examples can further provide the encryption logic to encrypt the particular session key using an encryption key shared by the first and second devices, and I/O logic to cause the encrypted particular session key to be sent to the second device.

In at least one example, the encryption key is provisioned on each of the first and second devices at manufacture.

In at least one example, the encrypted particular session key is to be sent to the second device over a sideband channel.

In at least one example, the second device includes a transcoder of a media gateway device.

In at least one example, the key refresh structure is to be prepended to particular content.

One or more embodiments may provide an apparatus, a system, a machine readable storage, a machine readable medium, and a method to provide decryption logic to receive a set of encrypted packets and a key refresh structure associated with the set of encrypted packets, identify from the key refresh structure, a particular one of a plurality of session keys designated for use in encrypting content sent between a first device and a second device, and decrypt the set of encrypted packets with the particular session key.

One or more examples can further provide transcoder logic, where the content includes media content, and the transcoder logic is to transcode the decrypted media content.

One or more examples can further provide encryption logic to encrypt the transcoded media content using one of the plurality of session keys, where the encrypted transcoded media content is to be sent to a first device with a corresponding key refresh structure that is to identify the session key used to encrypt the transcoded media content.

In at least one example, the session key used to encrypt the transcoded media content is different from the particular session key.

In at least one example, the different session key and particular session key are included in an associated pair of session keys.

In at least one example, the different session key is included in a second session key pair and the particular session key is included in a different, first session key pair.

One or more examples can further provide decryption logic to identify a refresh of a first session key included in the first session key pair, where the refresh includes receipt of the second session key pair.

In at least one example, both the first and second session key pairs are to be maintained at least until a subsequent refresh of session keys in the second session key pair.

In at least one example, the second session key pair is to be received from the first device and is to be sent encrypted using an encryption key shared by the first device and the transcoder.

One or more embodiments may provide an apparatus, a system, a machine readable storage, a machine readable medium, and a method to I/O logic to request generation of at least one new session key for use in encrypting content between a first device and a second device in a session, assign the new session key a key identifier, where the new session key is one of a plurality of session keys to be used by the first and second devices in the session and each of the plurality of session keys is to be associated with a respective key identifier. The I/O logic can further cause a set of packets to be encrypted using the new session key, and send the encrypted set of packets from the first device to the second device, where sending the set of packets includes generating a key refresh structure to be included with the encrypted set of packets and identify that the new session key was used by the first device to encrypt the set of packets.

The apparatus of claim 19, where assigning the key identifier includes identifying a particular key identifier of a preceding session key and determining a next key identifier according to an identification scheme, and the next key identifier is the key identifier of the new session key.

The apparatus of claim 20, where the next key identifier is to be determined by incrementing the particular key identifier.

The apparatus of claim 19, where the I/O logic is further to provide data to the second device identifying that the assignment of the key identifier to the new session key.

One or more embodiments may provide an apparatus, a system, a machine readable storage, a machine readable medium, and a method to provide a media gateway including a system-on-chip to serve content packets, a transcoder to transcode the content packets, and a security encryption controller. The security encryption controller can generate a plurality of session keys during a session between the transcoder and system-on-chip, where a plurality of sets of content packets are to be sent between the transcoder and system-on-chip, each set of content packets is to be encrypted by a respective one the plurality of session keys, and each encrypted set of content packets is to be sent to include a key refresh structure identifying the respective session key used to encrypt the set of content packets.

One or more examples can further provide a security encryption controller included on the system-on-chip and further to encrypt sets of content packets sent from the system-on-chip to the transcoder using the plurality of session keys, and encrypt encrypted sets of content packets sent from the transcoder to the system-on-chip using the plurality of session keys.

In at least one example, the media gateway further includes key management logic to manage refreshes of session keys used during the session, where a refresh is to replace a previous set of session keys used by the transcoder and system-on-chip in the session with a new set of session keys, each key in the previous and new sets of session keys has an associated key identifier, and the transcoder and system-on-chip are to maintain the previous set of session keys and the new set of session keys at least until a refresh of the new set of session keys.

In at least one example, the key management logic is to identify to the transcoder association between session keys and corresponding key identifiers.

In at least one example, each set of session keys includes a respective system-on-chip session key for use by the system-on-chip to encrypt content packets to be sent to the transcoder and for use by the transcoder to decrypt encrypted packets received from the system-on-chip, and a respective transcoder session key for use by the transcoder to encrypt transcoded content packets to be sent to the system-on-chip and for use by the system-on-chip to decrypt encrypted packets received from the transcoder.

Reference throughout this specification to "one embodiment," "an embodiment," "one example," "one instance," etc. means that a particular feature, structure, or characteristic described in connection with the embodiment is included in at least one embodiment of the present invention. Thus, the appearances of the phrases "in one embodiment" or "in an embodiment," etc. in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   encryption logic to:
     identify a particular session key, wherein the particular session key is one of a plurality of session keys for use in encrypting content to be sent from a first device in a session;
     encrypt a first portion of the particular content with the particular session key to obtain first encrypted content;
     identify a refresh of the particular session key during the session, wherein the refresh corresponds to a transition from use of the particular session key to use of another one of the plurality of session keys in the session and comprises sending a second session key pair including the other session key to a second device over a sideband channel; and
     encrypt a second portion of the particular content with the other session key to obtain second encrypted particular content;
   I/O logic to:
     cause the first encrypted content to be sent with a first key refresh structure to the second device for transcoding, wherein the first key refresh structure is to identify that the particular session key was used to encrypt the first encrypted content within the session to identify to the second device that a corresponding first session key pair is to be used in decryption of the first encrypted content; and
     cause the second encrypted particular content to be sent with a second key refresh structure, wherein the second key refresh structure is to identify that the other session key was used to encrypt the second encrypted content within the session to identify to the second device that the corresponding second session key pair is to be used in decryption of the second encrypted content.

2. The apparatus of claim 1, wherein the first key refresh structure includes a first key identifier mapped to the particular session key and the second key refresh structure includes a second key identifier mapped to the other session key.

3. The apparatus of claim 2, wherein mappings of key identifiers to respective session keys in the plurality of session keys are accessible to both the first and second devices.

4. The apparatus of claim 1, wherein the encryption logic is further to generate the particular session key, wherein the particular session key is to be associated with a particular key identifier identifiable to each of the first and second devices and included in the key refresh structure.

5. The apparatus of claim 4, wherein the encryption logic is further to encrypt each of the particular session key and the other session key using an encryption key shared by the first and second devices; and
the I/O logic is further to cause the encrypted particular session key and the encrypted other session key to each be sent to the second device.

6. The apparatus of claim 5, wherein the encryption key is provisioned on each of the first and second devices at manufacture.

7. The apparatus of claim 5, wherein the encrypted particular session key and the encrypted other session key are each to be sent to the second device over a sideband channel.

8. The apparatus of claim 1, wherein the second device comprises a transcoder of a media gateway device.

9. The apparatus of claim 1, wherein the first key refresh structure is to be sent prepended to the first encrypted content and the second key refresh structure is to be sent prepended to the second encrypted content.

10. An apparatus comprising:
decryption logic to:
receive encrypted data and a key refresh structure associated with the encrypted data in a session, wherein the encrypted data and the key refresh structure are received from a first device;
identify from the key refresh structure, a particular one of a plurality of session keys stored at a second device to be used to decrypt the set of encrypted packets, wherein the particular session key is in a first session key pair, and each of the plurality of session keys is designated for use in at least one of encryption or decryption of data sent between the first device and the second device;
decrypt the encrypted data with the particular another session key in the first session key pair; and
identify a refresh of session keys comprising receiving to second session key pair;
transcoder logic to transcode the decrypted data; and
encryption logic to encrypt the transcoded data using a second one of the plurality of session keys, wherein the second session key is in the second session key pair, and the encrypted transcoded data is to be sent with a corresponding key refresh structure that is to identify that the second session key was used to encrypt the transcoded data.

11. The apparatus of claim 10, further comprising transcoder logic, wherein the data comprises media content.

12. The apparatus of claim 10, wherein the second device comprises a transcoder device and the first device comprises a system on chip (SOC).

13. The apparatus of claim 10, wherein the second session key used to encrypt the transcoded data is different from the particular session key.

14. The apparatus of claim 10, wherein both the first and second session key pairs are to be maintained at least until a subsequent refresh of session keys in the second session key pair.

15. The apparatus of claim 10, wherein the second session key pair is to be received from the first device and is to be sent encrypted using an encryption key shared by the first device and the second device.

16. An apparatus comprising:
I/O logic to:
request generation of at least one new session key pair for use in encrypting and decrypting content between a first device and a second device in a session, wherein the new session key is to replace a preceding session key pair used to encrypt and decrypt content between the first device and the second device in the session;
assign the new session key pair at least one key identifier, wherein the new session key pair is one of a plurality of session key pairs to be used by the first and second devices in the session and each of the plurality of session key pairs is to be associated with at least one respective key identifier;
cause a set of packets to be encrypted using a particular session key in the new session key pair; and
send the encrypted set of packets from the first device to the second device with a key refresh structure, wherein sending the set of packets includes generating the key refresh structure, the key refresh structure includes the key identifier of the new session key pair and is to identify that the particular session key was used by the first device to encrypt the set of packets and that another session key in the new session key pair is to be used to decrypt the encrypted set of packets, and mapping of the key identifiers to their corresponding session keys in the plurality of session keys is to be secret to the first and second devices.

17. The apparatus of claim 16, wherein assigning the key identifier includes identifying a particular key identifier of a preceding session key pair and determining a next key identifier according to an identification scheme, and the next key identifier is the key identifier of the new session key pair.

18. The apparatus of claim 17, wherein the next key identifier is to be determined by incrementing the particular key identifier.

19. The apparatus of claim 16, wherein the I/O logic is further to provide data to the second device identifying that the assignment of the key identifier to the new session key pair.

20. A system comprising:
a media gateway comprising:
a system-on-chip to:
serve content data;
encrypt the content data; and
send the encrypted content data with a key refresh structure to a transcoder;
the transcoder to:
receive the encrypted content data and the key refresh structure;
identify from the key refresh structure, a particular one of a plurality of session keys stored at the transcoder to be used to decrypt content data received from the system-on-chip;
decrypt the encrypted content with the particular session key, wherein the particular session key is included in a first session key pair;
transcode the decrypted content data; and
encrypt the decrypted transcoded content data using a second one of the plurality of session keys, wherein the second session key is in a different, second session key pair, and the encrypted transcoded data is to be returned to the system-on-chip with a corresponding key refresh structure that is to identify that the second session key was used to encrypt the transcoded data; and
a security encryption controller to generate the plurality of session keys during sessions between the transcoder and system-on-chip.

21. The system of claim 20, wherein the security encryption controller is included on the system-on-chip and is further to perform encryption and decryption of content data for the system-on-chip.

22. The system of claim 20, wherein the media gateway further comprises key management logic to:
manage refreshes of session keys used during the session, wherein each refresh is to replace a previous set of session keys used by the transcoder and system-on-chip in the session with a new set of session keys, each key in the previous and new sets of session keys has an associated key identifier, and the transcoder and system-on-chip are to maintain the previous set of session keys and the new set of session keys at least until a refresh of the new set of session keys.

23. The system of claim 22, wherein the key management logic is to identify to the transcoder associations between session keys and corresponding key identifiers.

24. The system of claim 22, wherein each set of session keys includes:
a respective system-on-chip session key for use by the system-on-chip to encrypt content data to be sent to the transcoder and for use by the transcoder to decrypt encrypted data received from the system-on-chip; and
a respective transcoder session key for use by the transcoder to encrypt transcoded content data to be sent to the system-on-chip and for use by the system-on-chip to decrypt encrypted data received from the transcoder.

* * * * *

UNITED STATES PATENT AND TRADEMARK OFFICE
CERTIFICATE OF CORRECTION

PATENT NO. : 9,467,425 B2  
APPLICATION NO. : 13/846176  
DATED : October 11, 2016  
INVENTOR(S) : Edward C. Epp, Zhaohui Yan and Daniel P. Johnson Page 1 of 1

It is certified that error appears in the above-identified patent and that said Letters Patent is hereby corrected as shown below:

On the Title Page

Item (74) Attorney, Agent, or Firm: delete "Patent Capitol Group" and insert -- Patent Capital Group; --, therefor.

In the Drawings

On sheet 8 of 9, in Figure 8B, reference number 830, Line 1, delete "encyprted" and insert -- encrypted --, therefor.

Signed and Sealed this  
Fourteenth Day of March, 2017

Michelle K. Lee  
*Director of the United States Patent and Trademark Office*